United States Patent [19]

Herbrich et al.

[11] Patent Number: 4,481,632
[45] Date of Patent: Nov. 6, 1984

[54] LASER, PARTICULARLY $CO_2$ GAS TRANSPORT LASER

[75] Inventors: Horst Herbrich, Kelkheim; Rainer Kuchler, Frankfurt am Main; Erich Streng, Bad Homburg von der Hohe, all of Fed. Rep. of Germany

[73] Assignee: Messer Griesheim GmbH, Frankfurt, Fed. Rep. of Germany

[21] Appl. No.: 409,711

[22] Filed: Aug. 19, 1982

[30] Foreign Application Priority Data

Sep. 12, 1981 [DE] Fed. Rep. of Germany ....... 3136231

[51] Int. Cl.$^3$ ............................................. H01S 3/22
[52] U.S. Cl. ........................................ 372/58; 372/87; 372/61

[58] Field of Search ................... 372/55, 58, 98, 107, 372/108, 87, 61

[56] References Cited

U.S. PATENT DOCUMENTS 3,671,883 6/1972 Smars ................................... 372/58

Primary Examiner—William L. Sikes
Assistant Examiner—Léon Scott, Jr.
Attorney, Agent, or Firm—Connolly and Hutz

[57] ABSTRACT

A gas transport laser has several discharge sections through which the laser gas flows and is attached on mounts. The mounts have borings for connection of the discharge tube sections, as well as for the intake and discharge in such a manner that the discharge tube sections, the gas supply and the gas discharge are parallel to each other.

5 Claims, 3 Drawing Figures

LASER, PARTICULARLY CO2 GAS TRANSPORT LASER

BACKGROUND OF INVENTION

The present invention concerns a laser, particularly a $CO_2$ gas transport laser with several discharge tube sections attached in mounts and accommodating the flow of laser gas.

Under this main concept, reference is made to the state of the art known, e.g., from German DE-OS No. 27 41 737. In this known laser, the discharge tube sections are connected over the mount in such a manner that the tube sections provide a nonfolded discharge tube, at the beginning and end of which laser mirrors are provided. The supply lines for the laser gas as well as the discharge lines for the laser gas are located beside the mounts and are, accordingly, led past the mounts and the discharge tube sections. This causes a complicated structure of the laser, particularly when there are more than two discharge tube sections and a corresponding number of mounts.

Investigations and research concerning $CO_2$ gas transport layers have led to the recognition that an increase of the laser performance can be achieved if several short, optimum discharge tube sections are coupled in series, whereby each discharge tube section has its separate power and gas supply or gas discharge. An arrangement of this type can also be advantageously used for pulsation of laser beams. For instance, if four discharge tube sections of this type would be correspondingly coupled in series in the five required mounts, thus in a sense, four laser modules after one another, a laser effect of more than 1 KW can be obtained with the corresponding dimensions and design of the laser tubes and with sufficient gas supply, with a total discharge tube length (discharge tube sections) of approximately 1 m.

On the basis of the initially mentioned state of the art, a laser design would emerge where, although the total length can be relatively short, the volume will be large, considering the gas supply and gas discharge lines that are to be provided. As a result, the total laser become unwieldy and, in particular, it cannot be assembled without problems as a mobile processing tool on a guide machine, e.g., for cutting of materials.

SUMMARY OF INVENTION

It is therefore the purpose of the present invention to avoid the disadvantages cited above and to create a laser of the type initially mentioned, namely one that can be compactly designed, with small volume, for high laser output in the KW range.

In order to solve this problem, the invention suggests that borings be provided in the mounts for connecting the discharge tube sections as well as for the laser gas intake and discharge. The borings are located in the mounts in such a manner that the discharge tube sections, the gas supply lines, and the gas discharge lines are parallel. It is also suggested that, in an advantageous further development, the mounts are L-shaped and that a longitudinal boring is provided in each leg of these mounts, whereby the center axes of the longitudinal borings are parallel to the attachment planes of the mounts and at different distances from the attachment plane.

The invention would thus offer the advantage that the discharge tube sections as well as the gas supply and gas discharge lines can be arranged side by side in three different planes, resulting in a very simple as well as space-saving structure, i.e., a compact one, of the entire laser unit. The suggested L-shape would also make it possible and advantageous to keep all mounts identical and arrange them differently in respect to their attachment level only. For instance, if there are five mounts, the first, the middle, and the fifth mount would be designed as horizontal L-mounts, while the central ones, i.e., the second and fourth mount, would be provided as inverted L, i.e., with an 180° shift. This would make it possible and advantageous to construct a laser with an arbitrary number of discharge tube sections in a space-saving and economical way, using one type of mount and thus a minimum number of basic components.

Preferably the longitudinal borings in the L-shaped mounts are passage borings with identical diameter. With slip-on connection plates, it would then be possible to connect various tube diameters to these longitudinal passage borings. The invention offers the additional advantage that a gas cooling unit can very simply be located in the longitudinal boring for the gas discharge line and the beginning of the gas discharge line proper; this unit would preferably be designed as a gilled pipe hose cooler.

Preferably, the mounts are water cooled, whereby cooling canals are provided on both sides of the longitudinal boring for connecting the discharge tube sections and parallel to this longitudinal boring.

An additional advantage of the L-shaped design, the mounts, and the related arrangement of the above-mentioned tubes is that this arrangement allows a square cross-section for a housing enclosing the mounts and tubes, which is particularly advantageous in respect to manufacturing and stability.

THE DRAWINGS

DETAILED DESCRIPTION

Figure 1:
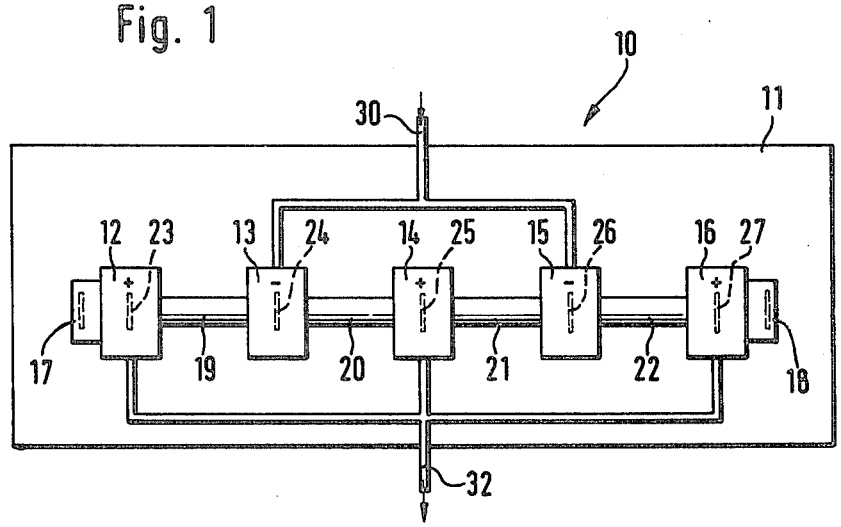
FIG. 1 shows a schematic structure of the laser according to the invention.

FIG. 1 illustrates the schematic structure of a $CO_2$ gas transport laser. The $CO_2$ gas transport laser, which is in its entirety identified as 10, has a housing 11, in which mounts 12, 13, 14, 15 and 16 are provided. A laser mirror 17 and 18, respectively, is dedicated to each one of the mounts 12 and 16. The mounts 12 through 16 serve to accommodate the discharge tube sections 19, 20, 21 and 22 through which laser gas flows. Furthermore, electrodes 23 through 27 are provided in the mounts 12 through 16 whereby the electrodes 23, 25, 27 are connected to the positive pole and the electrodes 24, 26 to the negative pole of a known laser power supply source. Mounts 13 and 15 are connected to a laser gas supply line 30, and mounts 12, 14 and 16 to a laser gas discharge line 32.

Figure 3:
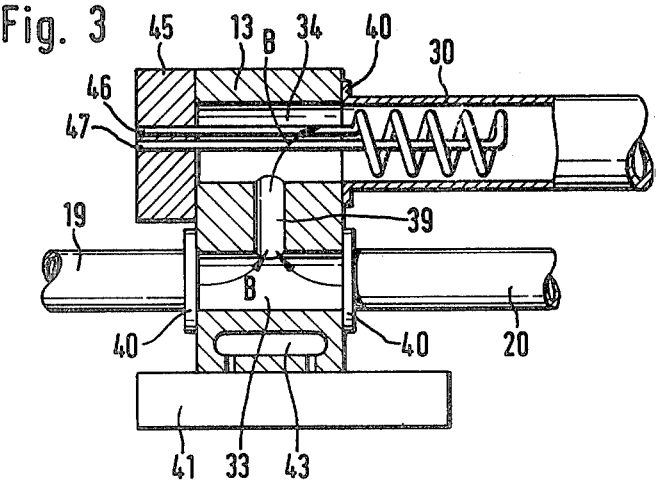
FIG. 3 is a section along the line A—A in FIG. 2, with the gas cooling unit.

According to the present invention and as illustrated, particularly in FIG. 3, the mounts 12 through 16 have borings 33, 34. The boring 33 serves to join and connect the discharge tube sections 19 through 22. Boring 34 serves to connect the gas supply 30 or the gas discharge 32. Borings 33 and 34 are arranged in the mount in such a manner that, as can be seen from FIG. 2, the discharge tube sections 19 through 22 as well as the gas supply line 30 and the gas discharge line 32 are parallel to one another. As can also be seen from FIG. 2, the mounts 12 through 16 are L-shaped. In each leg, identified as 12a through 16a and 12b through 16b, there is a longitudinal boring, 33 or 34, whereby the center axes of these borings 33, 34 are parallel with the attachment plane 35 of the mounts 12 through 16. Furthermore, the center axes of the longitudinal borings 33, 34 are at different distances 36, 37, 38 from the attachment plane. The longitudinal borings 33, 34 are also interconnected by means of a lateral boring 39, which is shown more clearly in FIG. 3. Preferably, the longitudinal borings 33, 34 are passage borings with identical diameters. By means of slip-on connector plates 40, it is possible to accommodate different diameters for discharge or gas discharge or gas supply tubes.

Figure 2:
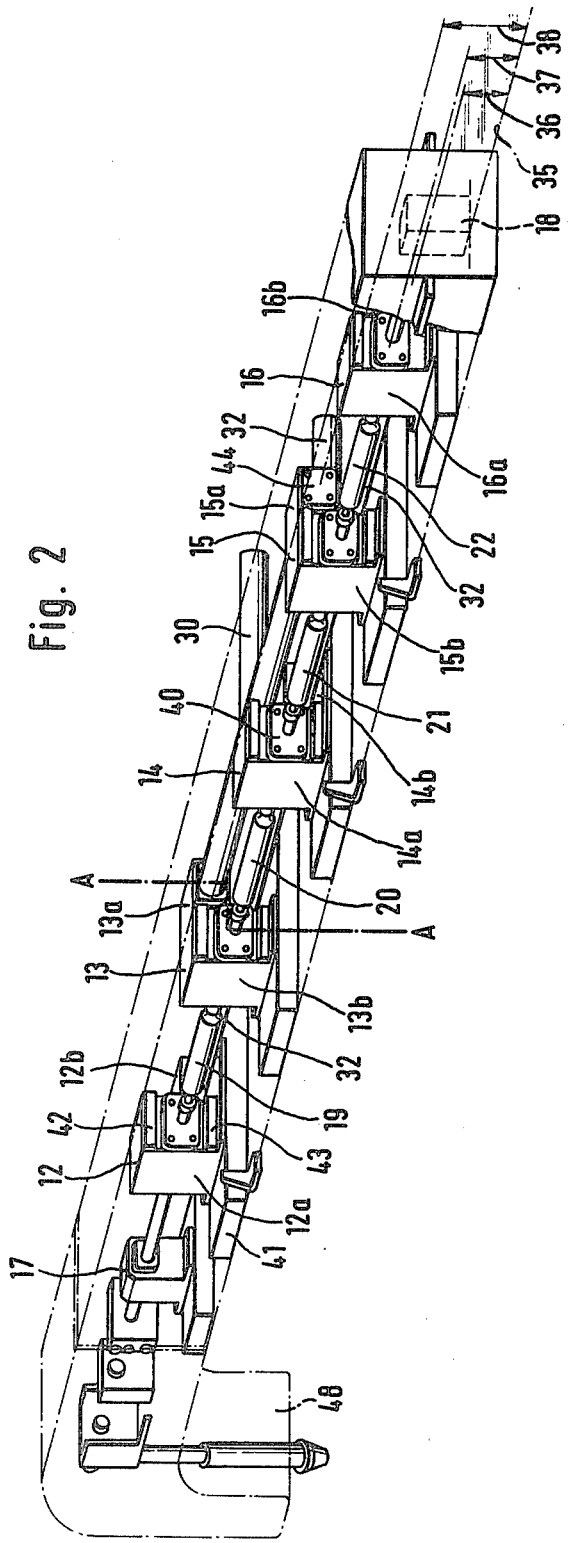
FIG. 2 is a perspective view of the laser according to the invention.

As can further be seen from FIG. 2, the L-shape of the mounts makes it possible to attach these with such displacements that a square cross-section of a housing enclosing the mount and the various tubes would be applicable. Particularly, this is possible because the mounts 12, 14 and 16 are attached in the L position, while mounts 13 and 15 are attached to their respective attachment plates 41 as an L rotated 180° and standing upside down. This design facilitates a particularly simple and space saving design for the laser in its entirety.

Furthermore, cooling canals 42, 43 are provided in the mounts 12 through 16 whereby the canals are parallel to the longitudinal boring 33 and located on both sides of the longitudinal boring 33. According to the position of the mount as horizontal (e.g., mount 12) or vertical (e.g., mount 13) coolant is supplied to the cooling canal 43 (mount 12) or cooling canal 42 (mount 13) via canals in the attachment plate 41, which are not shown in detail.

As already explained, the borings 33 and 34 are executed as longitudinal passage borings with equal diameter, whereby the diameter is determined by the amount of gas to be passed through.

The unconnected side of a longitudinal boring is closed off by means of a closing plate 44, e.g., as is the case in mounts 13 and 15.

According to an additional suggestion encompassed by the present invention, a gas cooling unit can be applied instead of this closing plate 44, both in the longitudinal boring and in the gas discharge line 32, as is shown, e.g., in FIG. 3. The same gas cooling unit 45 can also be advantageously placed in the mount 13. Preferably, the gas cooling unit 45 is designed as a gilled tube hose cooler, whereby the gilled tube is of helix shape and the cooling unit has an intake 46 as well as an outlet 47 for the coolant, preferably water. This direct cooling of the laser gas which is suctioned off in the direction of the arrow is made possible in a simple manner based on the design of the mount, and thereby, the hot laser gas that has to be suctioned off, will be sufficiently cooled immediately after it is suctioned off, so that this gas has no thermal influence on the entire laser.

For the sake of completeness, it should also be pointed out that a processing head which is schematically represented in FIG. 2 is also connected to the laser housing illustrated in FIG. 2.

The above described design of the mount makes it possible to advantageously construct a laser with simple identical components from individual modules and for multiple output levels; the design and volume is significantly smaller and more compact than known executions, and it is consequently a tool which is simple to handle and which can be mounted immediately and without great difficulties as a mobile tool on a guide machine.

In summary, a laser transport system 10 has several discharge tube sections 19, 22 through which laser gas flows, and which are attached in mounts 12 through 16. In order to achieve a design that is simple and compact in respect to volume, these mounts 12 through 16 are preferably L-shaped and enclose borings 33, 34 for connecting the discharge tube sections 19 through 22 as well as the laser gas intake 16 and laser gas outlet 32. The borings are arranged in the mounts 12-16 in such a manner that the discharge tube sections 19, 22, the gas supply lines 30, and the gas discharge line 32 are parallel to each other and preferably arranged with a relative vertical displacement in respect to each other.

What is claimed is:

1. In a gas transport laser system having a plurality of discharge sections through which laser gas flows and being attached on mounts, the improvement being in that said mounts have borings for connection of the discharge tube sections as well as for the laser gas intake and the laser gas discharge, said borings being located in said mounts in such a manner that said discharge tube sections and said gas supply and said gas discharge are parallel with one another, an electrode being in each of said mounts, said electrodes in adjacent mounts being of opposite polarity, said electrodes in the end most mounts being of the same polarity, said gas supply communicating with each of said mounts having their electrodes of the same polarity, said gas discharge communicating with the remaining intermediate mounts having their electrodes of opposite polarity to mounts communicating with said gas supply; and a laser mirror being attached to each one of said end most mounts which accommodate said discharge tube sections through which laser gas flows.

2. Laser according to claim 1, characterized thereby that said mounts are L-shaped, a longitudinal boring being provided in each leg of said mounts, the center axes of said longitudinal borings being parallel to the attachment plane of its mount and at different distances from the attachment plane, and said longitudinal borings being interconnected by means of a lateral boring.

3. Laser according to claim 2, characterized thereby that said longitudinal borings have the same diameter, and various tube diameters can be accommodated by means of slip-on connector plates.

4. Laser according to one of claims 1 through 3, characterized thereby that a gas cooling unit can be accommodated in said longitudinal boring as well as in said gas discharge line.

5. Laser according to claim 4, characterized thereby that said system is a $CO_2$ gas transport, and said cooling unit being a gilled tube hose cooler.

* * * * *